(12) United States Patent
Hong et al.

(10) Patent No.: US 8,937,593 B2
(45) Date of Patent: Jan. 20, 2015

(54) INTERACTIVE PROJECTION SYSTEM AND METHOD FOR CALIBRATING POSITION OF LIGHT POINT THEREOF

(71) Applicant: Everest Display Inc., Hsinchu (TW)

(72) Inventors: Hei-Tai Hong, Hsinchu County (TW); Fu-Hsiung Lee, Hsinchu (TW)

(73) Assignee: Everest Display Inc., Hsinchu (TW)

( * ) Notice: Subject to any disclaimer, the term of this patent is extended or adjusted under 35 U.S.C. 154(b) by 130 days.

(21) Appl. No.: 13/791,817

(22) Filed: Mar. 8, 2013

(65) Prior Publication Data

US 2014/0145948 A1   May 29, 2014

(30) Foreign Application Priority Data

Nov. 26, 2012 (TW) .............................. 101144102 A (51) Int. Cl.
*G06F 3/033* (2013.01)
*G06F 3/038* (2013.01)

(52) U.S. Cl.
CPC ...................................... *G06F 3/038* (2013.01)
USPC ..... 345/158; 345/204; 348/231.3; 348/231.6; 348/33.11; 348/222.1; 382/293; 382/295; 382/296

(58) Field of Classification Search
USPC .................... 345/158, 204; 348/231.3, 231.6, 348/333.11, 333.12, 222.1, 241, 250; 382/293, 294, 295, 296, 298, 284, 300
See application file for complete search history.

(56) References Cited

U.S. PATENT DOCUMENTS

| | | | |
|---|---|---|---|
| 2002/0070944 A1* | 6/2002 | Deering | 345/581 |
| 2004/0140982 A1* | 7/2004 | Pate | 345/600 |
| 2005/0206856 A1* | 9/2005 | Ishii | 353/94 |
| 2005/0270499 A1* | 12/2005 | Ishii et al. | 353/94 |
| 2007/0290996 A1* | 12/2007 | Ting | 345/157 |
| 2008/0062164 A1* | 3/2008 | Bassi et al. | 345/214 |

* cited by examiner

*Primary Examiner* — Shaheda Abdin
(74) *Attorney, Agent, or Firm* — Li & Cai Intellectual Property (USA) Office (57) ABSTRACT

A method for calibrating position of light point is used for an interactive projection system including an image capture device. The image capture device includes an image sensor and an optical filter. The method includes the following steps. A plurality of calibrating patterns formed by visible light is individually projected on a screen. The distance between the calibrating pattern with big area and an optical axis of the image sensor is larger than that between the calibrating pattern with small area and the optical axis. Next, the exposure time of the image sensor is adjusted so the image sensor can capture the images of the calibrating patterns through the optical filter. According to the images of the calibrating patterns, a plurality of coordinate positions is gotten. Then, the coordinate positions are adjusted according to a standard coordinate.

11 Claims, 8 Drawing Sheets

INTERACTIVE PROJECTION SYSTEM AND METHOD FOR CALIBRATING POSITION OF LIGHT POINT THEREOF

BACKGROUND OF THE INVENTION

1. Field of the Invention

The present invention relates to an interactive projection system and a method for calibrating position of a light point; in particular, to an interactive projection system which can sense the invisible light point and an automatic calibration method for the position of the light point thereof.

2. Description of Related Art

The present projection system develops an interactive projection system, which usually includes a projection device, an image sensor, and a pointer. The pointer has an infrared light source and can emit invisible infrared light. The image sensor is such as a CMOS image sensor (CIS) and capable of sensing the infrared light from the pointer.

When the projection device projects an image onto a screen according to data that a computer outputs, the pointer can be used for emitting the infrared light to the screen, thereby forming an invisible light point on the screen. Meanwhile, the image sensor senses and tracks the light point so that the image projected from the projection device can show a position and a track depending on the light point. Thus, the user can use the light point as a cursor to control the computer.

When using the pointer to control a projector or a computer, in order to prevent the image which is projected from projection device from affecting the image sensor, the image sensor usually contains a filter, which can filter out the visible light and allow the infrared light to reach the image sensor. Hence, the image sensor can only sense the infrared light and not sense the visible light. Therefore, when controlling the interactive projection system, the image sensor can not be affected by the image projected from projection device, so as to attenuate the incorrect operation of the projection device of the computer.

Before using the interactive projection system, a calibration of position usually needs to be performed to make the screen correctly show the position and the track depending on the light point. Since the image sensor can not sense the visible light, some common interactive projection systems need to use the invisible light points to perform the calibrations of position. Thus, the present calibration of the position of the light point usually needs a user to carry out. That is, the calibration of position generally is performed manually.

SUMMARY OF THE INVENTION

The present invention provides an interactive projection system including an image capture device which can capture a calibrating pattern formed by visible light.

The present invention also provides a method for calibrating the position of a light point, and the method suitable for the interactive projection system can automatically calibrate the position of the light point.

An embodiment of the present invention provides an interactive projection system including a projection device and an image capture device. The projection device has a projection lens. The projection lens uses to project a plurality of calibrating patterns onto the screen individually, and the calibrating patterns are formed by visible light. The areas of the calibrating patterns are not all equal. The image capture device includes an image sensor and a filter, in which the image sensor is connected to the projection device. The filter is fixed on the image sensor. The image sensor with an optical axis passing through the filter is used to capture the images of the calibrating patterns through the filter. The distance between the optical axis and the calibrating pattern with the large area is larger than the distance between the optical axis and the calibrating pattern with the small area.

Another embodiment of the present invention provides a method for calibrating the position of a light point, and the method is used for an interactive projection system. The interactive projection system includes an image capture device. The image capture device includes an image sensor and a filter. The filter is fixed on the image sensor. The image sensor with an optical axis passing through the filter. In the method for calibrating the position, first, project a plurality of calibrating patterns onto a screen individually, and the calibrating patterns are formed by visible light. The areas of the calibrating patterns are not all equal, while the distance between the optical axis and the calibrating pattern with the large area is larger than the distance between the optical axis and the calibrating pattern with the small area. Thereafter, adjust an exposure time of the image sensor to make the image sensor capture the images of the calibrating patterns through the filter. Get a plurality of coordinate positions according to the images of the calibrating patterns. After that, adjust the coordinate positions according to a standard coordinate.

To sum up, the interactive projection system use the image capture device with the filter to capture the calibrating patterns formed by visible light, so as to obtain the function of automatically calibrating the position of light point.

In order to further the understanding regarding the present invention, the following embodiments are provided along with illustrations to facilitate the disclosure of the present invention.

DETAILED DESCRIPTION OF THE PREFERRED EMBODIMENTS

Figure 1A:
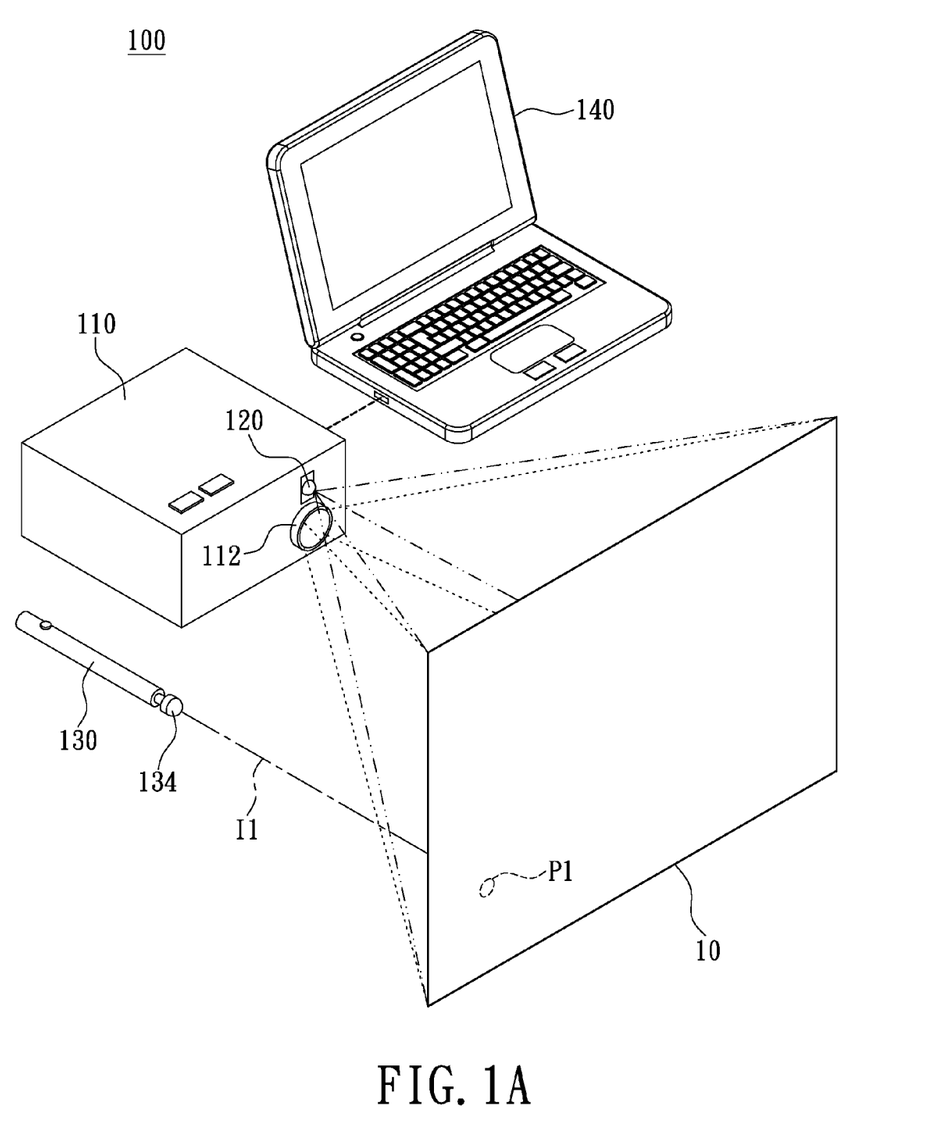
FIG. 1A illustrates a perspective view of an interactive projection system in accordance with an embodiment of the instant disclosure.

FIG. 1A illustrates a perspective view of an interactive projection system in accordance with an embodiment of the instant disclosure. Referring FIG. 1A, the interactive projection system 100 includes a projection device 110, an image capture device 120 and at least an indication device 130. The projection device 110 has a projection lens 112 and can establish a signal link with a host device 140. The host device 140 may be a laptop, a tablet computer, or a host computer.

The projection device 110 can receive a signal that is outputted by the host device 140 so that the projection lens 112 projects images onto a screen 10 depending on the signal. The signal may be an electrical signal or a wireless signal. Hence, the signal link between the projection device 110 and the host device 140 may be a wireless link or an electrical connection with circuitry.

When the signal link between the projection device 110 and the host device 140 is the electrical connection, the projection device 110 includes an image transfer cable (not shown), and the host device 140 has a connection port, such as a VGA port or a HDNI port, fitting the image transfer cable. When the signal link between the projection device 110 and the host device 140 is the wireless link, the wireless link between the projection device 110 and the host device 140 can be established by a Bluetooth connection or a wireless network.

The indication device 130 includes a light source 134 which can emit invisible light I1, so as to form an indicating light point P1 onto the screen 10. The wavelength of the invisible light I1 may range between 800 nm and 1000 nm. The light source 134 is such as an infrared LED. Moreover, the light source 134 is switched on or off for controlling to emit the invisible light I1 by a bottom. Alternatively, the light source 134 may have a touch switch so the light source 134 can emit the invisible light I1 when touching the screen 10.

The indication device 130 may further include a wireless emitting module (not shown), whereas the host device 140 may include a wireless receiving module (not shown). The wireless emitting module of the indication device 130 can output a wireless signal to the wireless receiving module of the host device 140 for controlling the host device 140. That is, the host device 140 can be controlled by operating the indication device 130. Moreover, the wireless receiving module may be a hot pluggable device or a built-in wireless module. In addition, the number of the indication device 130 in FIG. 1A is only one, but the number of the indication device 130 included by the interactive projection system 100 in another embodiment may be two or more than two.

Figure 1B:
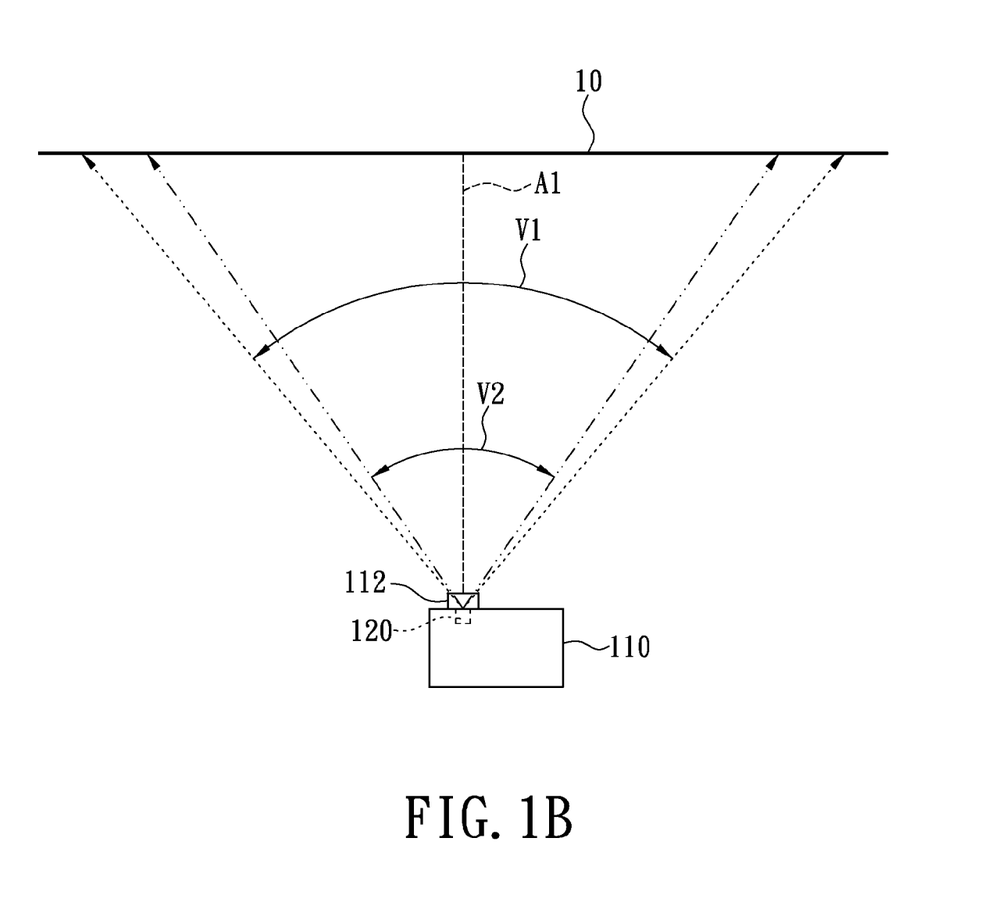
FIG. 1B illustrates a plane view of the interactive projection system in FIG. 1A.

FIG. 1B illustrates a plane view of the interactive projection system in FIG. 1A. Referring to FIG. 1A and FIG. 1B, the image capture device 120 is electrically connected to the projection device 110 and can sense the invisible light I1, thereby capturing the image of indicating light point P1. Hence, according to the position and the track of the indicating light point P1 onto the screen 10, the image capture device 120 can cause that the image which is projected by the projection device 110 changes depending on the position and the track of the indicating light point P1. Besides, the wireless emitting module of the indication device 130 can control the host device 140 in coordinate with the position and the track of the indicating light point P1. Therefore, the indicating light point P1 can be used as a cursor to operate the host device 140 though the indication device 130.

The image capture device 120 has an angle V1 of view and an optical axis A1 passing through the screen 10. The projection lens 112 has an angle of view V2. The angle of view V1 is larger than the angle of view V2. Thus, the sensed area of the screen 10 that the image capture device 120 can sense is larger than the projection area that the projection lens 112 projects onto the screen 10, so that the sensed area covers the projection area completely.

Figure 1C:
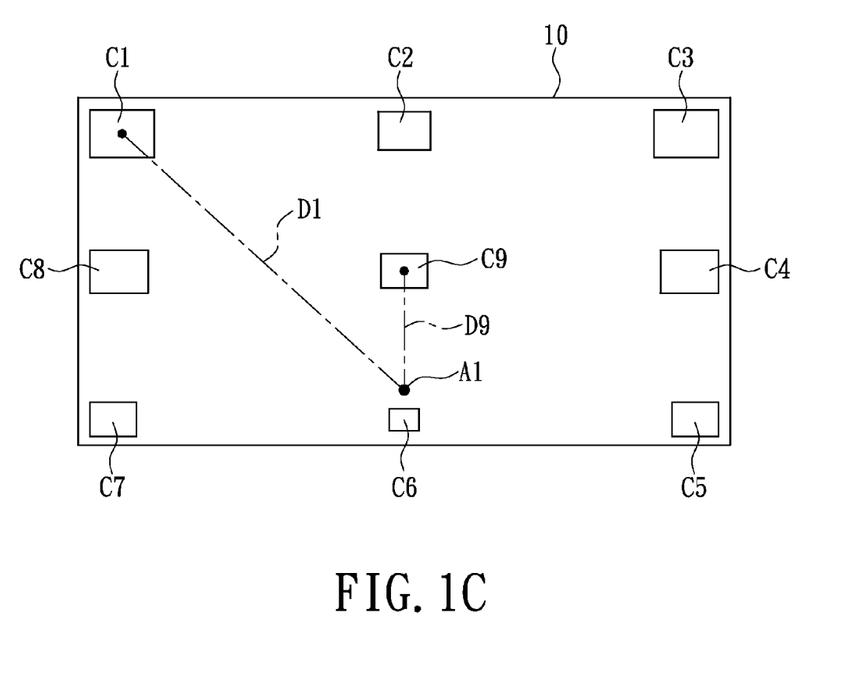
FIG. 1C illustrates the calibrating patterns which are projected onto the screen by the projection device in FIG. 1A.

FIG. 1C illustrates the calibrating patterns which are projected onto the screen by the projection device in FIG. 1A. Referring to FIG. 1B and FIG. 1C, the projection lens 112 can project a plurality of calibrating patterns onto the screen 10 individually, and the calibrating patterns are formed by visible light. The areas of the calibrating pattern are not all equal.

Taking FIG. 1C as an example, the projection lens 112 can project 9 calibrating patterns onto the screen 10. The 9 calibrating patterns includes 1st calibrating pattern C1, 2nd calibrating pattern C2, 3rd calibrating pattern C3, 4th calibrating pattern C4, 5th calibrating pattern C5, 6th calibrating pattern C6, 7th calibrating pattern C7, 8th calibrating patter C8, and 9th calibrating patter. From the view of the FIG. 1C, the areas of 1st calibrating pattern C1 to 9th calibrating patter C9 are not all equal obviously, and the positions onto the screen 10 of 1st calibrating pattern C1 to 9th calibrating patter C9 are different from each other.

In all of the calibrating patterns, the distance between the optical axis A1 and the calibrating pattern with the large area is larger than the distance between the optical axis A1 and the calibrating pattern with the small area. Thus, in the screen 10, the smaller the distance between the calibrating pattern and the optical axis A1 is, the larger the area of the calibrating pattern is, whereas the larger the distance between the calibrating pattern and the optical axis A1 is, the smaller the area of the calibrating pattern is. In addition, the calibrating pattern with large area corresponds to large angle of view of the image capture device 120, whereas the calibrating pattern with small area corresponds to small angle of view of the image capture device 120.

Taking FIG. 1C as an example, the area of 1st calibrating pattern C1 is larger than the area of 9th calibrating patter C9 so that the distance D1 between 1st calibrating pattern C1 and the optical axis A1 is larger than the distance D9 between 9th calibrating patter C9 and the optical axis A1. Moreover, the distance between the calibrating pattern and the optical axis A1 means the distance in screen 10 the between the center of the calibrating pattern and the optical axis A1.

Figure 2A:
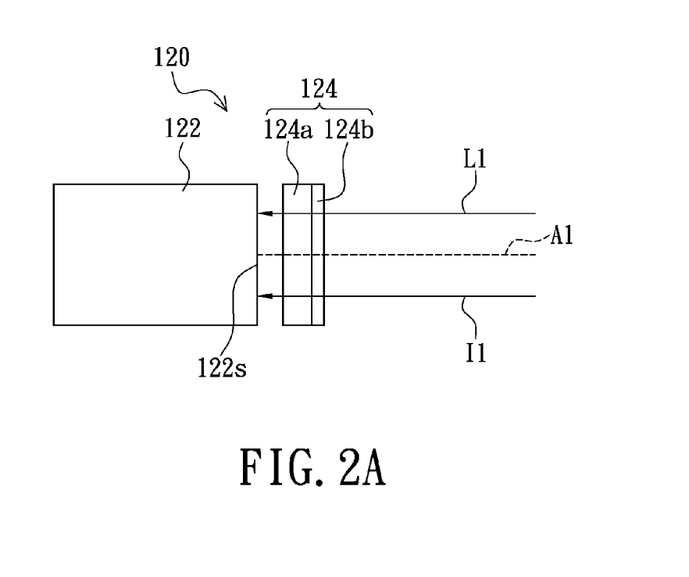
FIG. 2A illustrates a plane view of the image capture device in FIG. 1A.

FIG. 2A illustrates a plane view of the image capture device in FIG. 1A. Referring to FIG. 1A and FIG. 2A, the image capture device 120 includes an image sensor 122 and a filter 124, which can filter light. The image sensor 122 is electrically connected to the projection device 110. The filter 124 can be fixed on the image sensor 122 by an adhesive or screw-locking. During the normal operation of the interactive projection system 100, the filter 124 does not move relative to the image sensor 122 basically.

The filter 124 may includes a transparent plate 124a and an optical film 124b formed on the transparent plate 124a. The optical film 124b may be a single-layer film or a multilayer film. The transparent plate 124a is such as a glass plate or an acrylic plate and can be fixed on the image sensor 122 by an adhesive or screw-locking. However, the filter 124 may not include the transparent plate 124a and may be the optical film 124b formed directly on a sensing face 122s.

The image sensor 122 has the optical axis A1 and the sensing face 122s. The optical axis A1 passes through the filter 124. The sensing face 122s is used to receive light. That is, the image sensor 122 senses the indicating light point P1 from the sensing face 122s. Furthermore, the image sensor 122 may be a CIS or a charge coupled device (CCD).

Figure 2B:
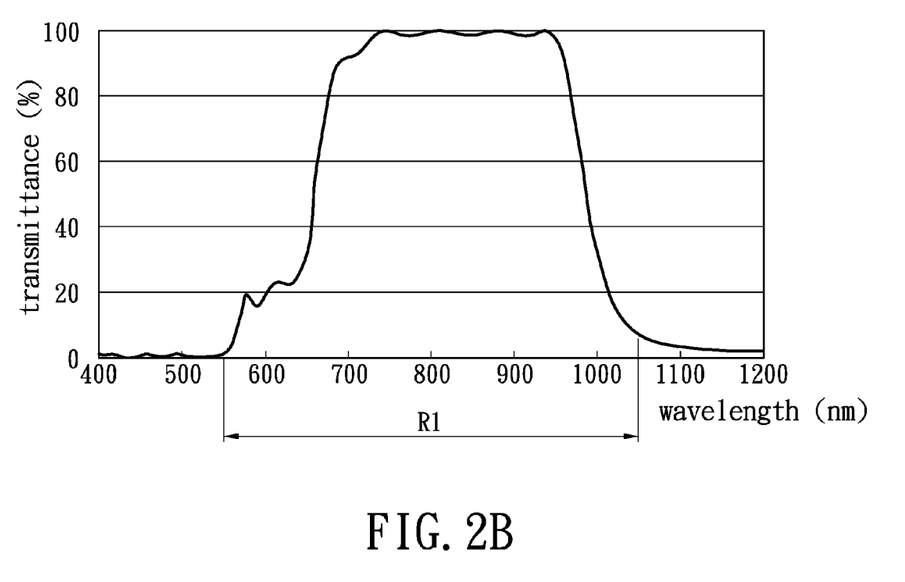
FIG. 2B illustrates the transmittance of the filter in FIG. 2A varying with the wavelength of light.

FIG. 2B illustrates the transmittance of the filter in FIG. 2A varying with the wavelength of light. Referring to FIG. 2A and FIG. 2B, the filter 124 can allow the light with a predetermined range R1 of wavelength to pass through. The predetermined range R1 includes the ranges of the visible light and the invisible light. Thus, the filter 124 can allow the invisible light I1 and the visible light L1 to pass through. The calibrating pattern can formed by the visible lightL 1. Thus, both the invisible light I1 and the visible light L1 can pass through the filter 124 and then enter the sensing face 122s so that the image sensor 122 can capture the images of the capture calibrating pattern and the indicating light point P1 through the filter 124.

The predetermined range R1 of wavelength may range between 550 nm and 1000 nm. The filter 124 can allow the light with the wavelength in the predetermined range R1 to pass through. However, all of the rays of light with the wavelengths in the predetermined range R1 have different transmittances. Specifically, the transmittance of the filter 124 in wavelength between 550 nm and 600 nm ranges between 5% and 20%, whereas the transmittance of the filter 124 in wavelength between 800 nm and 1000 nm ranges between 80% and 100%.

When the wavelength of the visible light L1 ranges between 550 nm and 600 nm, and the wavelength of the invisible light I1 ranges between 800 nm and 1000 nm, the transmittance of the filter 124 corresponding to each calibrating pattern is less than the transmittance of the filter 124 corresponding to the indicating light point P1. Therefore, the image capture device 120 is easy to sense the indicating light point P1 but no easy to sense the calibrating patterns.

Figure 3A:
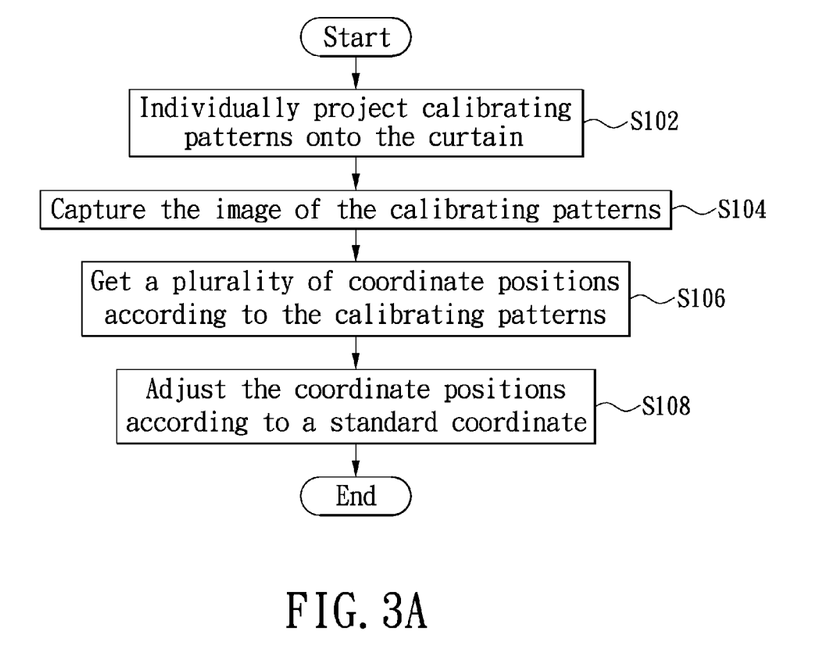
FIG. 3A illustrates a flow chart of a method for calibrating the position of the light point of the interactive projection system in FIG. 1A.

FIG. 3A illustrates a flow chart of a method for calibrating the position of the light point of the interactive projection system in FIG. 1A. Referring to FIG. 1A and FIG. 3A, the embodiment can be used for the interactive projection system 100 so as to calibrate the position of the light point automatically. The method for calibrating the position includes the following steps. First, perform the steps S102 and S104. That is, individually projects a plurality of calibrating patterns onto the screen 10, and capture the images of the calibrating patterns. The calibrating patterns may be 1st calibrating pattern C1 to 9th calibrating patter C9 in FIG. 1C.

In the step S102, the projection device 110 individually projects the calibrating patterns onto the screen 10. Specifically, the projection device 110 projects one calibrating pattern onto the screen each time so that the calibrating patterns do not appear on the screen 10 at the same time. The screen 10 shows only one calibrating pattern one time. Two or more than two calibrating patterns do not appear on the screen 10 at the same time.

In the step S104, the image sensor 122 has to capture the image when each of the calibrating patterns appears on the screen 10. After the image sensor 122 captures the image of one of the calibrating patterns, the projection device 110 starts to project the next calibrating pattern onto the screen 10 to make the image sensor 122 capture the image next time.

Since the image capture device 120 is not easy to sense the calibrating pattern formed by visible light, the exposure time of the image sensor 122 is adjusted during the process of capturing the calibrating pattern. Hence, the image sensor 122 can capture the images of the calibrating patterns through the filter 124. Besides the exposure time, the gain of the image sensor 122 can be adjusted to make the image capture device 120 easy to capture the images of the calibrating patterns.

Figure 3B:
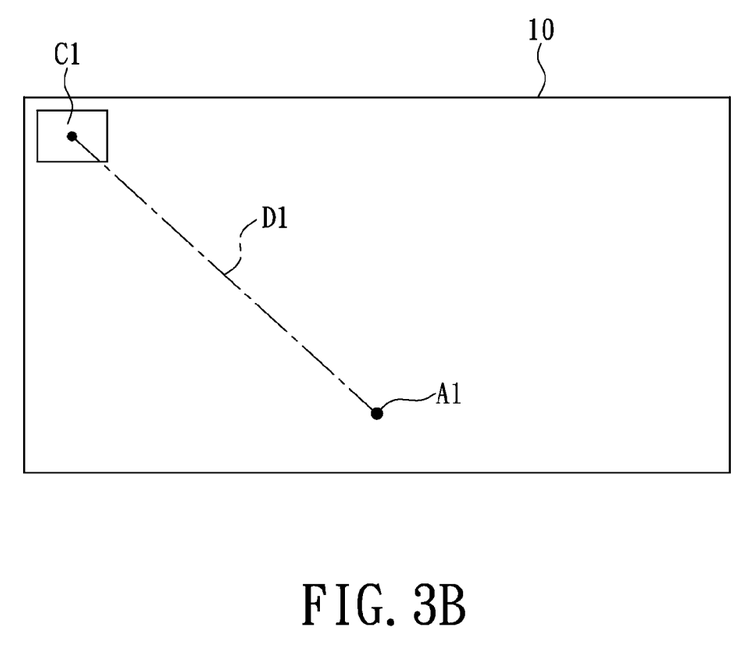
FIG. 3B to FIG. 3D illustrates projection and capture of 1st calibrating pattern to 3rd calibrating pattern.
Figure 3C:
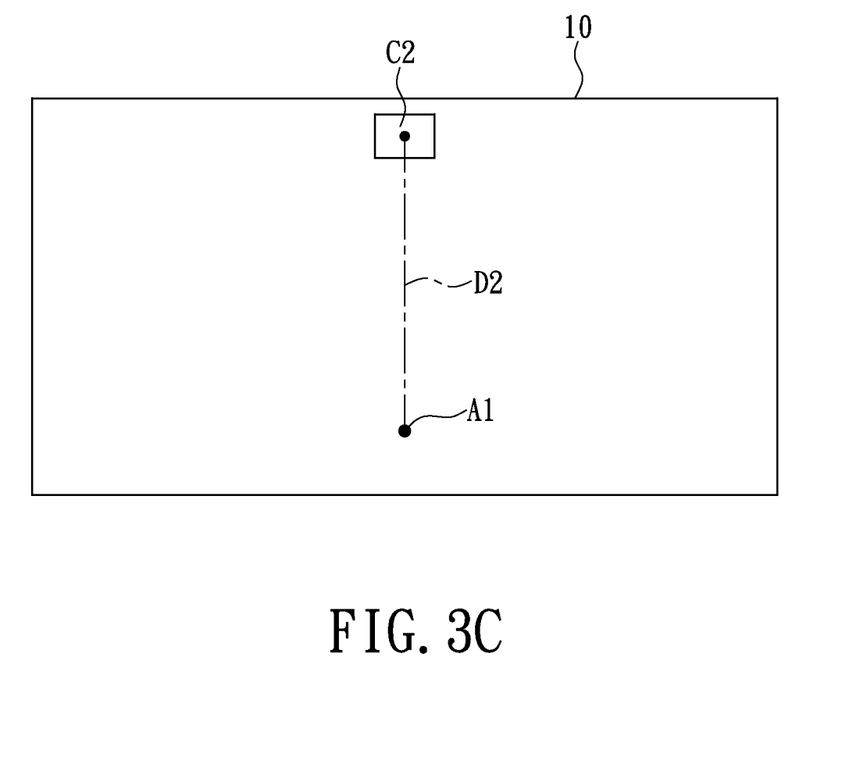
Figure 3D:
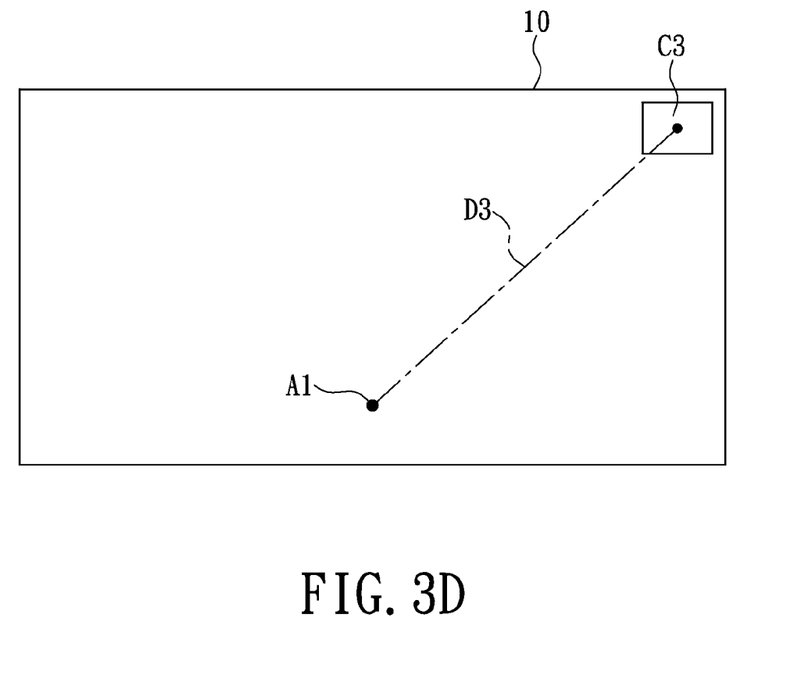

Taking FIG. 1C as an example with FIG. 3B to FIG. 3D, the step S102 and the step S104 are described in detail thereinafter. Referring to FIG. 3B, first, projection device 110 projects the 1st calibrating pattern C1 onto the screen 10. The projection device 110 only projects the 1st calibrating pattern C1 and does not project any other calibrating patterns. Thus, except the region appearing the 1st calibrating pattern C1, other regions of the screen 10 do not appear any light points or images from the projection device 110.

During the projection of the 1st calibrating pattern C1 onto the screen 10, the image sensor 122 captures the image of the 1st calibrating pattern C1 through the filter 124. Since the transmittance of the filter 124 corresponding to the calibrating pattern is low (about below 20%), the exposure time of the image sensor 122 increases when capturing the 1st calibrating pattern C1 so as to make sure that the image sensor 122 can capture the image of the 1st calibrating pattern C1. In addition, the exposure time of the image sensor 122 can be controlled by the processor of the projection device 110, and the projection may be such as a micro processor or a central processing unit (CPU).

If the exposure time of the image sensor 122 increases, and the image capture device 120 still does not capture the image of the 1st calibrating pattern C1, keep on increasing the exposure time of the image sensor 122. At this time, the image sensor 122 will capture the image of the 1st calibrating pattern C1 through the filter 124 again. During the image capturing of the 1st calibrating pattern C1, the image sensor 122 can capture the image of the 1st calibrating pattern C1 through different exposure time. The exposure time increases as the image capturing number of the 1st calibrating pattern C1 performed by the image sensor 122.

For example, during the image capturing of the 1st calibrating pattern C1 at first, the processor of the projection device 110 increases the exposure time of the image sensor 122, so that the first image capturing of the first calibrating pattern C1 is performed under 0.05 sec exposure time by the image sensor 122. Under the condition of 0.05 sec exposure time, if the image capture device 120 does not still capture the 1st calibrating pattern C1, the image sensor 122 increases the exposure time to 0.1 sec, while the image capture device 120 performs the second image capturing under 0.1 sec exposure time.

Accordingly, if the image sensor 122 fails to capture the 1st calibrating pattern C1, the image sensor 122 increases the exposure time in the next image capturing. As the image sensor 122 increases the exposure time, the image capturing of the 1st calibrating pattern C1 will not be terminated until the 1st calibrating pattern C1 is successfully captured. When the image sensor 122 captures the image of the 1st calibrating pattern C1, the processor of the projection device 110 records the exposure time at present and defines this exposure time as a constant exposure time. Furthermore, the processor of the projection device 110 can adjust the gain of the image sensor 122 to facilitate the image capturing of the 1st calibrating pattern C1. The processor records the gain and defines the gain as a constant gain when the image sensor 122 captures the image of the 1st calibrating pattern C1.

The projection device 110 individually projects the 2nd to 9th calibrating patters C2~C9 onto the screen 10 after both the exposure time and the gain are recorded. The image sensor 122 individually captures the images of the 2nd to 9th calibrating patters C2~C9 in sequence through the filter 124 under the constant exposure time and the constant gain.

Referring to FIG. 3C, the projection device 110 projects the 2nd calibrating pattern C2 onto the screen 10 after the image of the 1st calibrating pattern C1 is captured. Meanwhile, the image sensor 122 can use the constant exposure time and the constant gain to capture the image of the 2nd calibrating pattern C2 through the filter 124.

Referring to FIG. 3B and FIG. 3C, the distance D1 between the 1st calibrating pattern C1 and the optical axis A1 is larger than the distance D2 between the 2nd calibrating pattern C2 and the optical axis A1. Thus, the brightness of the 1st calibrating pattern C1 is lower than the brightness of the 2nd calibrating pattern C2 so the image of the 2nd calibrating pattern C2 is easier to be captured by the image sensor 122 than the image of the 1st calibrating pattern C1.

However, if the image sensor 122 uses both the constant exposure time and the constant gain to capture the image of the 1st calibrating pattern C1, the image sensor 122 can capture the image of the 2nd calibrating pattern C2 under the constant exposure time and the constant gain. That is to say, the image sensor 122 not only can capture the image of the 1st calibrating pattern C1, but also can capture the image of the 2nd calibrating pattern C2 through the constant exposure time and the constant gain.

The area of the 1st calibrating pattern C1 is larger that the area of the 2nd calibrating pattern C2. The distance D1 between the 1st calibrating pattern C1 and the optical axis A1 may be the largest distance between the optical axis A1 and the calibrating patterns so the brightness of the 1st calibrating pattern C1 may be the lowest brightness among the calibrating patterns. Hence, the area of the 1st calibrating pattern C1 can be the largest area among the calibrating patterns so that image sensor 122 facilitates the image capturing of the 1st calibrating pattern C1.

Referring to FIG. 3D, after the image of the 2nd calibrating pattern C2 is captured successfully, the projection device 110 projects the 3rd calibrating pattern C3 onto the screen 10. Meanwhile, the image sensor 122 can use both the constant exposure time and the constant gain to capture the image of the 3rd calibrating pattern C3 through the filter 124.

Referring to FIG. 3C and FIG. 3D, the distance D3 between the 3rd calibrating pattern C3 and the optical axis A1 is larger than the distance D2 between the 2nd calibrating pattern C2 and the optical axis A1 so the brightness of the 2nd calibrating pattern C2 is higher than the brightness the brightness of the 3rd calibrating pattern C3. Hence, the image of the 2nd calibrating pattern C2 is easier to be captured by the image sensor 122 than the image of the 3rd calibrating pattern C3.

The distance D3 between the 3rd calibrating pattern C3 and the optical axis A1 may be smaller than or equal to the distance D1, and the area of the 3rd calibrating pattern C3 may be smaller than or equal to the area of the 1st calibrating pattern C1. That is to say, the area of the 3rd calibrating pattern C3 may be smaller than or equal to the largest area among the calibrating patterns. Hence, the image of the 3rd calibrating pattern C3 can be captured under the constant exposure time and the constant gain.

Referring to FIG. 1B, after the image of the 3rd calibrating pattern C3 is captured, the projection device 110 individually projects the 4th to 9th calibrating patters C4~C9 onto the screen 10 in sequence. The image sensor 122 individually capture the images of the 4th to 9th calibrating patters C4~C9 through the filter 124 in sequence under the constant exposure time and the constant gain.

Referring to FIG. 3A, after the images of all of the calibrating patterns are captured successfully, perform the step S106. That is, a plurality of coordinate positions is gotten according to the calibrating patterns. Then, perform the step S108. That is, the coordinate positions are adjusted according to a standard coordinate. During the step S108, a bilinear interpolation or an arc interpolation can be used to obtain a data table related to both the standard coordinate and the coordinate positions. The coordinate positions can be adjusted via the data table.

The host device 140 or the processor of the projection device 110 can perform the step S106 and the step S108. The standard coordinate can be stored in the host device 140 or the memory of the projection device 110. Hence, the software in the host device 14 or the firmware recorded in the projection device 110 can perform the steps S102 to step S108.

In addition, FIG. 1B shows 9 calibrating patterns. However, the number of the calibrating patterns may be N, which is a positive integer. Beside 9, N may be larger than or equal to 4 so the number of the calibrating patterns is not limited.

Consequently, the interactive projection system uses the image capture device including the image capture device with the filter to capture both the calibrating patterns formed by the visible light and the invisible indicating light point. Hence, the image capture device can capture the indicating light point from the indication device so the indication device can control the projection device and/or the host device. Furthermore, the image capture device also can capture the images of the calibrating patterns for the calibration of the position of the light point.

Therefore, the interactive projection system according to the above disclosure can calibrate the position of the light automatically. That is, the method of calibration in the present invention can cause that the user do the calibration of the position of the light directly without starting the indication device. Compare to prior art, the present invention has advantages of easy operation and saving electricity of the indication device.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An interactive projection system comprising:
a projection device with a projection lens, and the projection lens used for projecting a plurality of the calibrating patterns formed by visible light onto a screen individually, wherein the areas of the calibrating patterns are not all equal;
an image capture device comprising an image sensor connected to the projection device and a filter fixed on the image sensor, wherein the image sensor has an optical axis passing through the filter and is used to capture the images of the calibrating patterns through the filter; and
a distance between the optical axis and the calibrating pattern with a large area is larger than a distance between the optical axis and the calibrating pattern with a small area.

2. The interactive projection system according to claim 1 further comprising an indication device with a light source used to emit an invisible light to form an indicating point onto the screen, wherein the image sensor captures the image of the indicating point through the filter, and the transmittance of the filter corresponding to each of the calibrating patterns is less than the transmittance of the filter corresponding to the indicating light point.

3. The interactive projection system according to claim 2, wherein the wavelength of the invisible light ranges between 800 nm and 1000 nm.

4. The interactive projection system according to claim 1, wherein the filter allow a light with a predetermined range R1 of wavelength to pass through, and the predetermined range of wavelength ranges between 550 nm and 1000 nm.

5. The interactive projection system according to claim 4, wherein the transmittance of the filter in wavelength between 550 nm and 600 nm ranges between 5% and 20%, whereas the transmittance of the filter 124 in wavelength between 800 nm and 1000 nm ranges between 80% and 100%.

6. A method for calibrating position of a light point used for an interactive projection system comprising an image capture device, wherein the image capture device comprising an image sensor and a filter fixed on the image sensor, and the image sensor has an optical axis passing through the filter, the method comprising the steps of:
individually projecting a plurality of calibrating pattern formed by a visible light onto a screen, wherein the areas of the calibrating patterns are invariable, and a distance between the optical axis and the calibrating pattern with a large area is larger than a distance between the optical axis and the calibrating pattern with a small area;

adjusting an exposure time of the image sensor to make the image sensor capture the images of the calibrating patterns through the filter;

getting a plurality of coordinate positions according to the images of the calibrating patterns; and adjusting the coordinate positions according to a standard coordinate.

7. The method according to claim 6, wherein the number of the calibrating patterns is N, which is a positive integer, and the calibrating patterns are 1st to Nth calibrating patterns projected onto the screen individually in sequence, the area of the 1st calibrating pattern is the largest area among the calibrating patterns, whereas the distance between the 1st calibrating pattern and the optical axis is the largest distance between the optical axis and the calibrating patterns.

8. The method according to claim 7, wherein capturing the images of the calibrating pattern comprises the steps of:

making the image sensor capture the image of the 1st calibrating pattern through the filter during the projection of the 1st calibrating pattern onto the screen;

recording the exposure time as a constant exposure time when the image of the 1st calibrating pattern is captured;

projecting 2nd calibrating pattern to Nth calibrating pattern onto the screen; and making the image sensor capture the images of the 2nd to Nth calibrating patterns under the constant exposure time.

9. The method according to claim 8, wherein the exposure time increases and the image sensor performs an image capturing of the 1st calibrating pattern through the filter when the image capture device fails to capture the image of the 1st calibrating pattern.

10. The method according to claim 8 further comprising the steps of:

adjusting a gain of the image capture device during the image capturing of the 1st calibrating pattern;

recording the gain as a constant gain when the image of the 1st calibrating pattern is captured;

projecting the 2nd to Nth calibrating patterns onto the screen individually in sequence after recording the exposure time and the gain; and making the image sensor capture the images of the 2nd to Nth calibrating patterns individually in sequence under the constant exposure time and the constant gain.

11. The method according to claim 6, wherein adjusting comprises the step of:

obtaining a data table related to both the standard coordinate and the coordinate positions by using a bilinear interpolation or an arc interpolation.

* * * * *